US009721263B2

(12) United States Patent
Fort

(10) Patent No.: US 9,721,263 B2
(45) Date of Patent: Aug. 1, 2017

(54) CONTINUOUSLY EVOLVING SYMMETRICAL OBJECT PROFILES FOR ONLINE ADVERTISEMENT TARGETING

(71) Applicant: Pavel A Fort, Westbury, NY (US)

(72) Inventor: Pavel A Fort, Westbury, NY (US)

(73) Assignee: NBCUniversal Media, LLC, New York, NY (US)

( * ) Notice: Subject to any disclaimer, the term of this patent is extended or adjusted under 35 U.S.C. 154(b) by 155 days.

(21) Appl. No.: 13/661,736

(22) Filed: Oct. 26, 2012

(65) Prior Publication Data

US 2014/0122165 A1 May 1, 2014

(51) Int. Cl.
*G06Q 10/00* (2012.01)
*G06Q 30/02* (2012.01)

(52) U.S. Cl.
CPC .................................... *G06Q 30/02* (2013.01)

(58) Field of Classification Search
CPC ........... G06Q 30/0251; G06Q 30/0241; G06Q 30/0277; G06Q 30/02; G06Q 10/00
USPC .......................................................... 705/7.29
See application file for complete search history.

(56) References Cited

U.S. PATENT DOCUMENTS

| | | | | |
|---|---|---|---|---|
| 5,754,938 | A * | 5/1998 | Herz et al. | 725/116 |
| 5,754,939 | A * | 5/1998 | Herz et al. | 455/3.04 |
| 5,848,396 | A * | 12/1998 | Gerace | 705/7.33 |
| 5,855,482 | A * | 1/1999 | Remer | 434/238 |
| 6,029,195 | A * | 2/2000 | Herz | 725/116 |
| 6,134,532 | A * | 10/2000 | Lazarus et al. | 705/14.25 |
| 6,460,036 | B1 * | 10/2002 | Herz | 707/748 |
| 6,526,411 | B1 * | 2/2003 | Ward | |
| 7,146,626 | B1 * | 12/2006 | Arsenault et al. | 725/46 |
| 7,464,092 | B2 * | 12/2008 | Lee et al. | |
| 7,603,371 | B1 * | 10/2009 | Pathak et al. | |
| 7,653,761 | B2 * | 1/2010 | Juster et al. | 710/18 |
| 7,786,367 | B2 * | 8/2010 | Hansson et al. | 84/600 |
| 7,805,522 | B2 * | 9/2010 | Schluter et al. | 709/228 |
| 7,806,329 | B2 * | 10/2010 | Dmitriev et al. | 235/383 |
| 7,822,636 | B1 * | 10/2010 | Ferber et al. | 705/14.4 |
| 8,169,916 | B1 * | 5/2012 | Pai et al. | 370/238 |
| 8,307,392 | B2 * | 11/2012 | Ahanger et al. | 725/36 |
| 8,468,056 | B1 * | 6/2013 | Chalawsky | 705/14.42 |
| 8,515,805 | B1 * | 8/2013 | Rennison | 705/14.26 |
| 8,521,661 | B2 * | 8/2013 | Wang et al. | 706/12 |

(Continued)

OTHER PUBLICATIONS

Microsoft Office SharePoint Server 2007—General Reference Microsoft, MSDN, 2007.*

*Primary Examiner* — Romain Jeanty

(57) ABSTRACT

A system is described that implements symmetrical object profiles across one or more objects, wherein an object profile is influenced by other object profiles with which it interacts. In particular, the system includes a configuration for a first object profile that is associated with a first object, wherein the first object profile comprises a set of attributes having a first set of valuations. The system includes a configuration for a second object profile that is associated with a second object, wherein the second object profile comprises said set of attributes having a second set of valuations. The system includes a profile updater for managing the first object profile and the second object profile, wherein in a transaction involving the first and second objects, corresponding object profiles are updated based on valuations in the first and second set of valuations.

20 Claims, 9 Drawing Sheets

(56) References Cited

U.S. PATENT DOCUMENTS

| | | | | |
|---|---|---|---|---|
| 8,688,706 | B2 * | 4/2014 | Liebald et al. | 707/738 |
| 2002/0124249 | A1 * | 9/2002 | Shintani et al. | 725/32 |
| 2006/0294084 | A1 * | 12/2006 | Patel et al. | 707/3 |
| 2007/0005795 | A1 * | 1/2007 | Gonzalez | 709/232 |
| 2007/0150537 | A1 * | 6/2007 | Graham | 709/203 |
| 2009/0063214 | A1 * | 3/2009 | Liu | 705/7 |
| 2009/0070435 | A1 * | 3/2009 | Abhyanker | 709/218 |
| 2009/0124241 | A1 * | 5/2009 | Krishnaswamy et al. | 455/414.2 |
| 2009/0171790 | A1 * | 7/2009 | Nagarajayya | 705/14 |
| 2009/0248494 | A1 * | 10/2009 | Hueter et al. | 705/10 |
| 2009/0299850 | A1 * | 12/2009 | Shim | 705/14.42 |
| 2009/0327081 | A1 * | 12/2009 | Wang et al. | 705/14.66 |
| 2010/0015691 | A1 * | 1/2010 | Krogh | 435/288.7 |
| 2010/0017704 | A1 * | 1/2010 | Jaffe et al. | 715/243 |
| 2010/0049774 | A1 * | 2/2010 | Pathak et al. | 707/803 |
| 2010/0161424 | A1 * | 6/2010 | Sylvain | 705/14.66 |
| 2010/0257053 | A1 * | 10/2010 | Ferber et al. | 705/14.45 |
| 2010/0262456 | A1 * | 10/2010 | Feng et al. | 705/10 |
| 2010/0312624 | A1 * | 12/2010 | Bilenko | 705/14.5 |
| 2011/0137753 | A1 * | 6/2011 | Moehrle | 705/27.1 |
| 2011/0208822 | A1 * | 8/2011 | Rathod | 709/206 |
| 2012/0124632 | A1 * | 5/2012 | Rothschild et al. | 725/114 |
| 2013/0024879 | A1 * | 1/2013 | Bruich et al. | 725/9 |
| 2013/0085858 | A1 * | 4/2013 | Sim et al. | 705/14.58 |
| 2013/0124298 | A1 * | 5/2013 | Li et al. | 705/14.42 |
| 2013/0159110 | A1 * | 6/2013 | Rajaram et al. | 705/14.66 |
| 2013/0167168 | A1 * | 6/2013 | Ellis et al. | 725/12 |
| 2013/0339163 | A1 * | 12/2013 | Dumontet et al. | 705/15 |
| 2014/0108395 | A1 * | 4/2014 | Polonsky et al. | 707/733 |

* cited by examiner

500

510 520 530

| CATEGORY | ATTRIBUTE | SCORE |
|---|---|---|
| GENDER | MALE 523A | |
| GENDER | FEMALE 523B | |
| AGE | UNDER 18 525A | |
| AGE | 19-25 525B | |
| AGE | 26-34 525C | |
| AGE | 35-44 525D | |
| AGE | 45-54 525E | |
| AGE | 55-65 525F | |
| AGE | OVER 65 525G | |
| GENRE | ACTION 527A | |
| GENRE | ROMANCE 527B | |
| GENRE | THRILLER 527C | |

100 PERCENT 513 515 517

FIRST OBJECT 610

| CATEGORY | ATTRIBUTE | SCORE |
|---|---|---|
| GENDER | MALE | 1.000 |
| GENDER | FEMALE | 0.000 |
| AGE | UNDER 18 | 0.000 |
| AGE | 19-25 | 0.000 |
| AGE | 26-34 | 0.000 |
| AGE | 35-44 | 1.000 |
| AGE | 45-54 | 0.000 |
| AGE | 55-64 | 0.000 |
| AGE | OVER 65 | 0.000 |
| GENRE | ACTION | 0.000 |
| GENRE | ROMANCE | 0.000 |
| GENRE | THRILLER | 0.000 |

620

630

655

SECOND OBJECT 650

| CATEGORY | ATTRIBUTE | SCORE |
|---|---|---|
| GENDER | MALE | 0.000 |
| GENDER | FEMALE | 1.000 |
| AGE | UNDER 18 | 0.000 |
| AGE | 19-25 | 0.000 |
| AGE | 26-34 | 0.000 |
| AGE | 35-44 | 0.000 |
| AGE | 45-54 | 0.000 |
| AGE | 55-64 | 0.000 |
| AGE | OVER 65 | 0.000 |
| GENRE | ACTION | 0.500 |
| GENRE | ROMANCE | 0.000 |
| GENRE | THRILLER | 0.500 |

| CONSUMER – A (2 TRANSACTIONS) | | | |
|---|---|---|---|
| CATEGORY | ATTRIBUTE | OLD SCORE | NEW SCORE |
| GENDER | MALE | 1.000 | 1/2 = 0.500 |
| GENDER | FEMALE | 0.000 | 1/2 = 0.500 |

720

725

727

| ASSET X (2 TRANSACTIONS) | | | |
|---|---|---|---|
| CATEGORY | ATTRIBUTE | OLD SCORE | NEW SCORE |
| GENDER | MALE | 0.000 | 1/2 = 0.500 |
| GENDER | FEMALE | 1.000 | 1/2 = 0.500 |

| CONSUMER – A (3 TRANSACTIONS) | | | |
|---|---|---|---|
| CATEGORY | ATTRIBUTE | OLD SCORE (percent) | NEW SCORE (percent) |
| GENDER | MALE | 0.500 | 1.633/3 = 0.544 |
| GENDER | FEMALE | 0.500 | 1.367/3 = 0.456 |

715B

717B

730

| ASSET Y (31 TRANSACTIONS) | | | |
|---|---|---|---|
| CATEGORY | ATTRIBUTE | OLD SCORE (percent) | NEW SCORE (percent) |
| GENDER | MALE | 0.633 | 19.49/31 = 0.629 |
| GENDER | FEMALE | 0.367 | 11.51/31 = 0.371 |

| CONSUMER – A (4 TRANSACTIONS) | | | |
|---|---|---|---|
| CATEGORY | ATTRIBUTE | OLD SCORE (percent) | NEW SCORE (percent) |
| GENDER | MALE | 0..544 | 2.383/4 = 0.596 |
| GENDER | FEMALE | 0.456 | 1.617/4 = 0.404 |

715C

717C

740

| ASSET Z (12 TRANSACTIONS) | | | |
|---|---|---|---|
| CATEGORY | ATTRIBUTE | OLD SCORE (percent) | NEW SCORE (percent) |
| GENDER | MALE | 0.750 | 8.794/12 = 0.732 |
| GENDER | FEMALE | 0.250 | 3.206/12 = 0.268 |

CONTINUOUSLY EVOLVING SYMMETRICAL OBJECT PROFILES FOR ONLINE ADVERTISEMENT TARGETING

CROSS REFERENCE TO RELATED APPLICATION

The present application is related to concurrently filed U.S. patent application Ser. No. 13/661,869, entitled "SYSTEM AND METHOD FOR MATCHING OBJECTS HAVING SYMMETRICAL OBJECT PROFILING," filed on Oct. 26, 2012, which is herein incorporated by reference in its entirety.

BACKGROUND

There are increasing numbers of distribution channels for connecting consumers with other items (e.g., products, services, content, information, etc.). For instance, the internet facilitates a communication network that joins millions of computers together. Through these distribution channels, users are able to access and search for information, make purchases of products, send and receive electronic mail, etc. As such, the internet and other distribution channels have become commonplace in the lives of the general populace.

Given these distribution channels, technology has evolved to help facilitate matching objects together, such as, the connection of a user with possibly desired items. For instance, targeting, as a form of matching, is used to connect or match various objects together, such as, advertisements and users). In practice, the delivery of advertisements to targeted users is an established technology that takes advantage of the distribution channels, wherein the advertisements are targeted to users exhibiting particular traits. In general, traits can include demographic, psychographic, consumer histories, and other user activities that help categorize or define a user. Further, traits may be compiled into a user profile that is specific to a particular user, wherein user profiles and the information contained within are used for targeting. Generally, an advertisement may be matched or targeted to a user profile exhibiting certain characteristics.

Unfortunately, there are many shortcomings to the targeting of items (e.g., advertising) to a particular group of users. These shortcomings lead to inefficient and non-effective targeting or matching. For instance, targeting relies heavily on the accuracy of the information contained within a user profile, and more specifically how accurately does that information define the particular user. However, user and object profiles suffer from various deficiencies that decrease the effectiveness of targeting.

As an example of the deficient use of user of user profiles for targeting, user profiles may contain inaccurate registration information, wherein a user may lie or misreport information used for identification in an effort to preserve privacy, or a general lack of desire to accurately define his or her interests. Also, user profiles and content tend to be static, wherein the information contained within a user profile does not change after its initial registration. A static profile does not accurately reflect the evolving interests of a user over time. Further, a user profile may not contain enough information to be used in the targeting process. This is especially true when a profile is first created. In that case, no targeting can occur until enough information is established in that profile. Moreover, user profiles that do no match any particular grouping of profiles used for targeting may never be selected for targeting. That is, if a profile falls outside the boundaries of characteristics defining one or more grouping of user profiles, that user profile will never be selected as a target for the delivery of advertising and/or other content.

It is desirous to have profiles that contain accurate and up-to-date information.

SUMMARY

In embodiments of the present invention, a system is described that implements symmetrical object profiles across one or more objects, wherein an object profile is influenced by other object profiles with which it interacts. In particular, the system includes a configuration for a first object profile that is associated with a first object, wherein the first object profile comprises a set of attributes having a first set of valuations. The system includes a configuration for a second object profile that is associated with a second object, wherein the second object profile comprises said set of attributes having a second set of valuations. The system includes a profile updater for managing the first object profile and the second object profile, wherein in a transaction involving the first and second objects, corresponding object profiles are updated based on valuations in the first and second set of valuations.

In another embodiment, a method for profiling is disclosed. The method includes establishing symmetrical object profile vectors for a first object and a second object. The vector comprises a set of attributes that define one or more characteristics attributable to the corresponding object. The method also includes determining that a transaction has occurred involving the first object and the second object. In one implementation, the transaction may involve connecting the first object and the second object through a communication network (e.g., internet), such as, the purchase of the second object by the first object. The method also includes accessing a first object profile that is associated with the first object, wherein the first object profile comprises the set of attributes having a first set of valuations. The method also includes accessing a second object profile associated with the second object, wherein the second object profile comprises the set of attributes having a second set of valuations. The method further includes, updating at a profile updater each of the first and second object profiles based on valuations in the first and second set of valuations.

In some embodiments, a system includes a tangible, non-transitory computer-readable storage medium having stored thereon, computer-executable instructions that, when executed causes the computer system to perform a method for profiling. The method includes establishing symmetrical object profile vectors for a first object and a second object. The vector comprises a set of attributes that define one or more characteristics attributable to the corresponding object. The method also includes determining that a transaction has occurred involving the first object and the second object. In one implementation, the transaction may involve connecting the first object and the second object through a communication network (e.g., internet), such as, the purchase of the second object by the first object. The method also includes accessing a first object profile that is associated with the first object, wherein the first object profile comprises the set of attributes having a first set of valuations. The method also includes accessing a second object profile associated with the second object, wherein the second object profile comprises the set of attributes having a second set of valuations. The method further includes, updating at a profile updater each of the first and second object profiles based on valuations in the first and second set of valuations.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5 is an illustration of a symmetrical object profile, in accordance with one embodiment of the present disclosure.

FIG. 6 is an illustration of the seeding of attribute valuations in two objects within a system configured for implementing symmetrical object profiles across one or more objects, wherein an object profile is influenced by other object profiles with which it interacts, in accordance with one embodiment of the present disclosure.

FIG. 7A is an illustration of a first state of an object profile of a consumer after an interaction with ASSET-X within a history of interactions involving the consumer, in accordance with one embodiment of the present disclosure.

FIG. 7B is an illustration of a second state of an object profile of a consumer after an interaction with ASSET-Y within a history of interactions involving the consumer, in accordance with one embodiment of the present disclosure.

FIG. 7C is an illustration of a third state of an object profile of a consumer after an interaction with asset-Z within a history of interactions involving the consumer, in accordance with one embodiment of the present disclosure.

DETAILED DESCRIPTION

Figure 1:
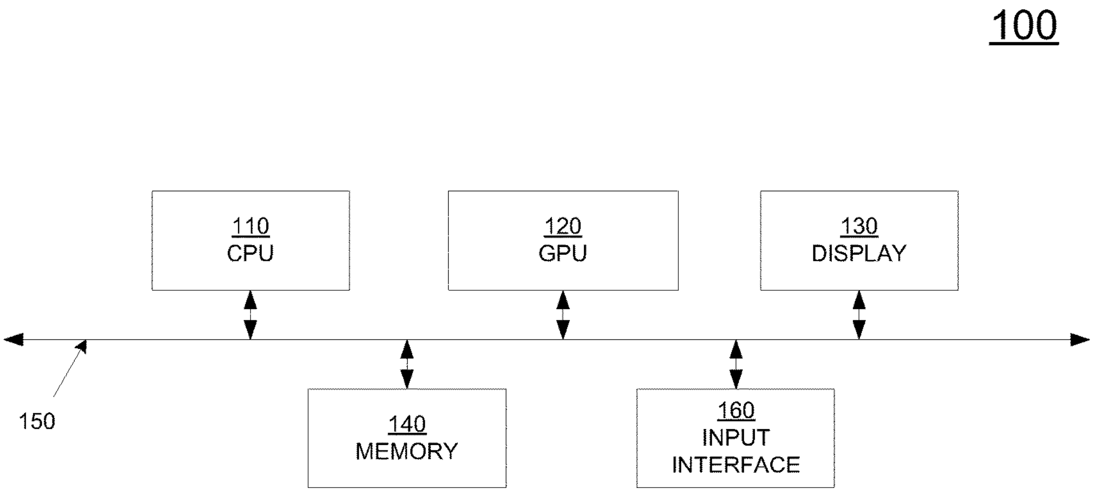
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "establishing," "determining," "accessing," "updating," or the like, refer to actions and processes (e.g., flowcharts 4 of FIG. 4) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for a system including symmetrical profiles for all objects and all object types to give more accurate reflections of relationships between the objects based on their interactions with each other. Other embodiments provide the above accomplishments and further provide for profiles that are updatable based on profile information for objects with which it interacts. Still other embodiments provide for object profiles that reflect the shading or fluidity of behavioral characteristics instead of being limited to absolute asset descriptions for those behavioral characteristics. Other embodiments provide a quick start to object profiles having no transactions or a minimal amount of transactions such that they are immediately useful, by populating asset valuations in a new object profile through seeding or absorption of profiles of other objects. Still other embodiments provide for self correcting object profiles that are able to minimize the effect of faulty profile information quickly within a few subsequent transactions.

Embodiments of the present invention are described within the context of managing object profiles for various purposes. However, other embodiments support object profiles that are managed and implemented outside of a web-based system for various purposes. More specifically, information contained within object profiles are used to understand characteristics of objects (e.g., consumers) to deliver and/or suggest appropriate advertisements, content, and user experiences. Also, once characteristics are defined for each object, information contained within object profiles are used to match two or more objects to each other (e.g., matching an object with an advertisement, asset, experience, etc). Further, information contained within object profiles are used to perform analytics for a variety of commercial, educational, and political reasons, to name a few.

In embodiments of the present invention, an object profile includes psychographic information used for defining a corresponding object or grouping of objects. The psychographic information describes behavioral characteristics, such as, those for a consumer or group of consumers, and describes its or their attitudes, perceptions, and behaviors. In general, psychographic information provides insight into the personality, values, attitudes interests and lifestyles of a corresponding object or grouping of objects.

Additionally, an object profile includes other types of information, including demographic information in other embodiments. For instance, demographic information is used to define the characteristics and statistics of a population of a region. Examples of demographic information include gender, race, age, home ownership, employment status, location, etc. In some instances, psychographic information includes and/or uses demographic information for defining behavioral characteristics of the corresponding object or grouping of objects. For instance, age may be used to describe a psychographic makeup of a consumer, such that instead of being labeled as a 35 year old on the basis of factual data, the consumer's behaviors, attitudes and actions reflect those of someone who is 10 years older. As such, the consumer's psychographic profile would be of a 45 year old.

In embodiments of the present invention, objects within a system are each associated with symmetrical object profiles containing the same attribute information. That is, within the system, all objects comprising one or more types of objects are defined by and are reflected by the same attributes, wherein objects comprise one or more types of objects (e.g., consumers, assets, products, advertisements, experiences, etc.). In that manner, any object takes on its own psychographic profile as defined by the attribute scores in its own object profile. More specifically, an inanimate object (e.g., product, asset, advertisement, experience, etc.) is defined by an object profile that is reflective of the objects (e.g., consumers) that it interacts with, such as, transactions involving two or more objects. For example, a movie as an object is defined by its object profile that is reflective of those consumers who have requested that movie, such as, in an online video content hosting site.

In another embodiment, symmetrical object profiles exist across a plurality of object types. For instance, a system including two object types (e.g., viewers and videos) also includes additional object types (e.g., third, fourth, and fifth types), wherein the objects spread across the five object types are associated with corresponding symmetrical object profiles comprising the same attributes. As an example, a first object type is a user, a second object type is an article, and a third object type is an online text based article including an embedded video associated with the article. In an interaction between objects, the user (object 1) reads the article (object 2), and watches the video (object 3) that is embedded in the article. There are two interactions: object 1>>object 2 (user reads article), and object 1>>object 3 (user views video). Symmetrical object profiles for each of the objects 1-3 would reflect these two interactions. That is, object profiles for all three objects are updated to reflect participation in these two interactions.

The implementation of symmetrical object profiles provides for closer and more accurate building of relationships between objects. In particular, direct attribute to attribute comparisons for one or more groupings of attributes within object profiles of two or more objects gives a sense of the closeness of matching between these objects. This enables better targeting of advertisements, other content, and online experiences (e.g., video links, applications, forums, etc.), as well as improved audience analytics. This in turn drives higher advertising costs per mile (CPMs), higher engagement with users, increased success of advertisement delivery, and development of new programming and customer relationship management strategies. All of this leads to increased revenue opportunities.

Figure 2:
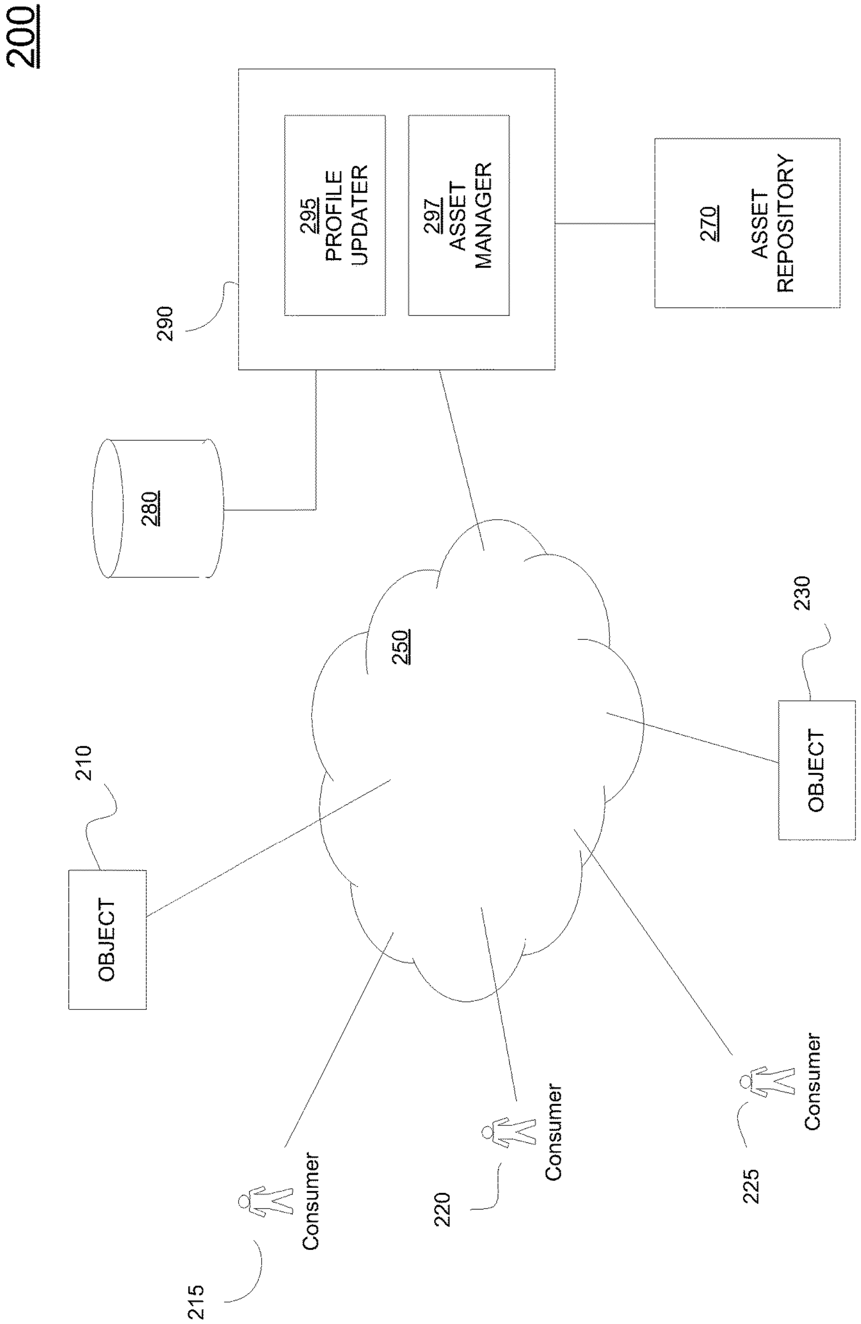
FIG. 2 is an illustration of a communication network facilitating transactions between one or more objects associated with symmetrical object profiles, in accordance with one embodiment of the present disclosure.

FIG. 2 is an illustration of a system 200 facilitating transactions between two or more objects associated with symmetrical object profiles, in accordance with one embodiment of the present disclosure. System 200 includes a communication network 250 that is capable of enabling communication between one or more objects and/or entities that are coupled to the network 250. For example, in one embodiment, the communication network 250 is the internet, but could be any suitable network capable of supporting transactions between two or more objects.

As shown, an online platform/site or host system 290 is coupled to communication network 250. Though shown as one block, host system 290 may include one or more actual servers located in one or more locations, but act to provide server functionality to support the management and distribution of a plurality of assets (e.g., television programs, video content, movies, etc.) stored in repository 270. For instance, host system 290 provides access to assets in repository 270 to one or more objects through communication network 250.

As shown in FIG. 2, generalized objects 210 and 230, as well as consumers 215, 220, 225 are coupled to communication network 250 through an associated computing resource. For illustration, consumers and/or other objects may be coupled to communication network 250 through a standalone computer, portable computer, mobile phone, smart phone, tablet, etc.).

For purposes of illustration only, communication system 200 may support a host system 290 that manages online content for purposes of distribution and archiving. Host system may comprise a part of a larger online entertainment service that provides for a source for users to search for and access entertainment content. For instance, host system 290 includes an asset manager 297 that manages and archives a plurality of assets stored in the repository 270. As an extension, host system 290 may provide access to those assets that are stored in the repository 270 to other objects within system 200. For example, host system 290 may manage video content (e.g., television/cable programming, movies, entertainment clips, news, etc.) that is made available to one or more objects. In that manner, a consumer (e.g., consumer 215) may interact with host system 290 to select a movie to download for viewing. The selection by the consumer defines a transaction involving the consumer and the movie, and in embodiments of the present invention, object profiles for both the consumer and the movie are updated to reflect that transaction. Other transactions between objects are supported within communication system 200. For instance, a transaction may be defined between object 210 and an asset managed by host system 290, wherein object 210 may include an asset, a consumer, another web site, a group of consumers, etc.

Host site 290 includes a profile updater 295 for managing a plurality of object profiles for objects associated with transactions handled by host system 290. For instance, a plurality of object profiles related to the assets stored in repository 270 are created, managed and stored by profile updater 295. As previously described, an object profile for an asset contained within asset repository 270 defines a psychographic profile that is reflective of object profiles requesting that asset through host system 290.

Additionally, profile updater 295 creates, manages, and stores a plurality of object profiles that are associated with other objects involved in transactions with objects and/or assets controlled by host system 290. That is, profiles are created by profile updater 295 for objects that interact with host system 290, such as, when requesting assets stored in repository 270. As an example, object profiles include those that are created for consumers (e.g., 215) requesting assets through host system 290. For instance, a consumer may voluntarily register with host system 290 in order to enable access to assets in repository 270, wherein the registration involves the creation of a corresponding object profile. A more detailed description for the creation and management of object profiles is provided in relation to FIG. 3.

Further, as shown in FIG. 2, storage module 280 is used to store the various object profiles as generated and managed by profile updater 295. As shown, storage module 280 is coupled locally to host system 290, in one embodiment. However, storage module 280 may be remotely located in other embodiments, and accessible through communication network 250. Still other embodiments are supported, wherein object profiles are stored at locations associated with a corresponding object, such as, a local computing resource.

Figure 3:
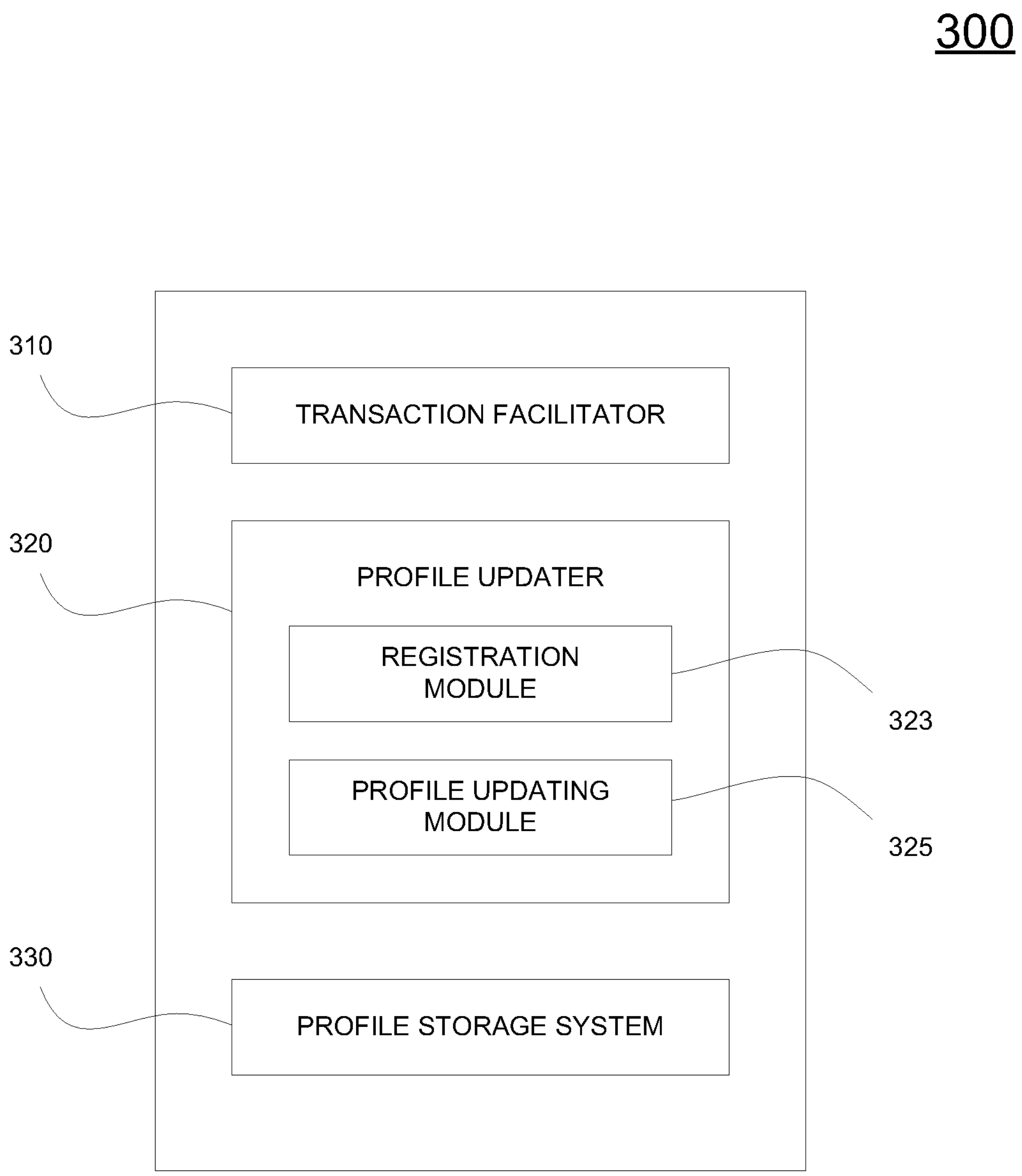
FIG. 3 is a system implementing symmetrical object profiles across one or more objects, wherein an object profile is influenced by other object profiles with which it interacts, in accordance with one embodiment of the present disclosure.

FIG. 3 is a system 300 implementing symmetrical object profiles across one or more objects, wherein an object profile is influenced by other object profiles with which it interacts, in accordance with one embodiment of the present disclosure. In that manner, transaction activity (e.g., consumption activity) is used to create continuously evolving, granular, object profiles for objects involved in a transaction (e.g., consumer purchasing a product) that can then be applied to targeting and analytical applications. In one embodiment, system 290 of FIG. 2 performs in part similar functions as system 300, such as, the creation and management of object profiles. In still another embodiment, system 300 is implemented within system 100 of FIG. 1.

As shown, system 300 includes a transaction facilitator 310. More specifically, facilitator 310 is configured to support the interaction between two or more objects, as defined by a transaction. For instance, a transaction facilitator 310 may provide an online search platform within which a consumer as one object may search for other objects, such as, goods and/or services, to include products, video content, online experiences, etc. As such, facilitator may support the interfaces that allow the consumer to interact with and to select one or more objects. For illustration, in one embodiment transaction facilitator is configured to allow a consumer to select from a plurality of video content (e.g., movies) for purchase and/or viewing download of a particular movie (e.g., Movie X), in a transaction involving two objects: the consumer and Movie X.

System 300 also includes a profile updater 320 that is capable of collecting and/or generating attribute information in an object profile associated with a corresponding object. As previously described, object profiles are symmetrical across all objects and all types of objects in a system facilitating transactions between those objects. For instance, profiles are mirrored between consumer objects and product/asset objects, such that in a transaction between a consumer and an asset, profiles for the consumer and asset reflect the interaction between those two objects as will be further described in relation to FIGS. 5-7. In that manner, closer relationships between objects can be realized based on the differences of one or more valuations of groupings of attributes in the symmetrical object profiles.

In particular, profile updater 320 creates and manages a first object profile that is associated with a first object. The first object profile comprises a set of attributes having a first set of valuations. That is, values for each of the set of attributes is contained in the first set of valuations. In one embodiment, the first object profile is of a first type, such as, that defining a consumer.

In addition, profile updater 320 creates and manages a second object profile that is associated with a second object. Because object profiles are symmetrical for all objects in a system facilitating transactions between those objects, the second object profile comprises the same set of attributes. However, the set of attributes associated with the second object has a second set of valuations. That is possibly different values for each of the set of attributes is contained in the second set of valuations. In one embodiment, the second object profile is of a second type, such as, that defining an asset (e.g., movie, product, experience, etc.).

More particularly, profile updater 320 includes a profile updating module 325 that is configured to update attribute valuations in the object profiles associated with the first object and the second object. In particular, in a transaction involving the first and second objects, the updating module 325 is configured to update object profiles for both the first and second objects based on valuations in the first and second set of valuations. That is, attribute valuations associated with the first object profile for the first object are updated to reflect the interaction with the second object. In that manner, the first object profile is influenced by the attribute valuations in the second object profile, and in a way takes on characteristics of the second object. In particular, the first object profile is updated based on the second set of valuations of attributes in the second object profile.

Likewise, attribute valuations associated with the second object profile for the second object are also updated to reflect the interaction with the first object. As such, the second object profile is influenced by the attribute valuations in the first object profile, and takes on characteristics of the first object. In particular, the second object profile is updated based on the first set of valuations of attributes in the first object profile.

The profile updating module 325 allows for continuous updates to each object profile. That is, instead of having static object profiles that do not change over time, embodiments of the present invention provide for object profiles that are updateable with each transaction. As such, in a transaction between two or more objects, corresponding object profiles are updated to reflect the characteristics of all objects involved in the transaction. In this manner, even an object profile for an object that lies dormant for a long period of time but then suddenly becomes a cult classic (e.g., cult movies), is able to reflect the behavioral characteristics of its ever changing consumers through continual updating of its object profile.

In one embodiment, profile updater 320 includes a registration module 323 for gathering initial information for a related object profile. For instance, a consumer may register with an online host system to enable access to content (e.g., news, information, television programming, movies, etc.) provided by that host system. In this case, when registering, the consumer may provide various items of information, including user name, local address, age, gender, income, certain preferences, etc. As such, information obtained during registration is used to seed the corresponding object profile with an initial set of valuations for attributes contained in the object profile.

In other embodiments, an object profile is seeded using third party information. For instance, user profiles from social networking sites may include information, such as, user name, address, etc. Additional behavioral information exhibited by the user and other personal information may also have been gathered and dissected for inclusion within the third party profile. This third party information may be gathered and filtered in order to seed the initial state of a corresponding object profile. For example, a consumer object that is associated with a third party social networking user profile, such that the object profile generated by profile updater 320 includes and/or is based on information obtained from the third party user profile.

In still another embodiment, an initial seeding is provided through an educated guess. For instance, for an asset profile, attribute valuations may be initially provided for one or more attributes such that the profile may be used immediately for matching and targeting purposes.

System 300 also includes a profile storage system 330 for storing object profiles of objects interacting in transactions in association with system 300, such as, through facilitator 310. More particularly, storage system 330 stores the first object profile and the second object profile. In addition, in association with each object profile, a history of transactions is also stored. That is, for a particular object, a history of transactions is involving that object with other objects is stored. In that manner, the object profile for that object is easily updated given any subsequent transactions with any other object.

Profile storage system 330 may be coupled locally with the profile updater for quick access. This provides for real-time updating of object profiles as transactions are occurring. In that manner, additional targeted content (e.g., advertisements, additional products, etc.) may be presented to one or more objects involved in a transaction based on the current valuations of attributes in corresponding object profiles. In still other embodiments, storage system 330 may be remotely located when latency is of lesser concern, or if network access is still fast enough that latency is mitigated.

In one embodiment, a profile is associated with a group of objects. Specifically, the group profile, also referred to as a "compound object profile," is still represented by the same set of attributes reflected in all the symmetrical object profiles within a system that facilitates transaction between those objects. In that case, an attribute valuation reflects the characteristic of the group as a whole, and not of an individual within the group. For instance, in one embodiment, each object in the group is associated with a corresponding object profile or compound object profile, and the group object profile is based on the individual object profiles of group members. In one example, attribute valuations for the group profile are averaged across all individual member object profiles. In particular, for a first attribute in the group profile, valuations of corresponding first attribute valuations of individual member object profiles are averaged across the total number of members in the group. In another embodiment, attribute valuations are determined using other methodologies.

For illustration only, a natural grouping of objects includes all immediate members of a certain family within a particular household, such as, father, mother, and any children. Other groupings may define a group of individuals within a certain population. Still other groupings may define a group of assets, such as, B horror movies. A group profile or compound object profile can be used to define behavioral characteristics of the entire group for purposes of increased object to object matching, targeted advertisement delivery, targeted content delivery, and targeted experiences delivery.

In one embodiment, all members are treated equally. That is, any transaction involving a single family member will affect the valuations in the group profile or compound object profile equally. As such, a transaction between a child and an object is treated the same as another transaction between a father and the same or different object. In these cases, any updating of the group profile is performed without consideration as to which member of the family participated in the transaction.

On the other hand, in another embodiment, group members are not treated equally. Some group members are given higher importance in relation to their influences on the group profile. For instance, a parent might be given greater importance and be a better gauge as to how the group as a whole will behave when it comes to financial decisions for purposes of advertisement, content, experience targeting. In these cases, members with greater importance may be weighted, such that any transaction involving those important members (parents) will be more heavily weighted than a transaction involving less important members (e.g., children), especially when involving transactions with financial bearing, such that parents who have greater purchasing power and decision making will more greatly influence the group profile.

Figure 4:
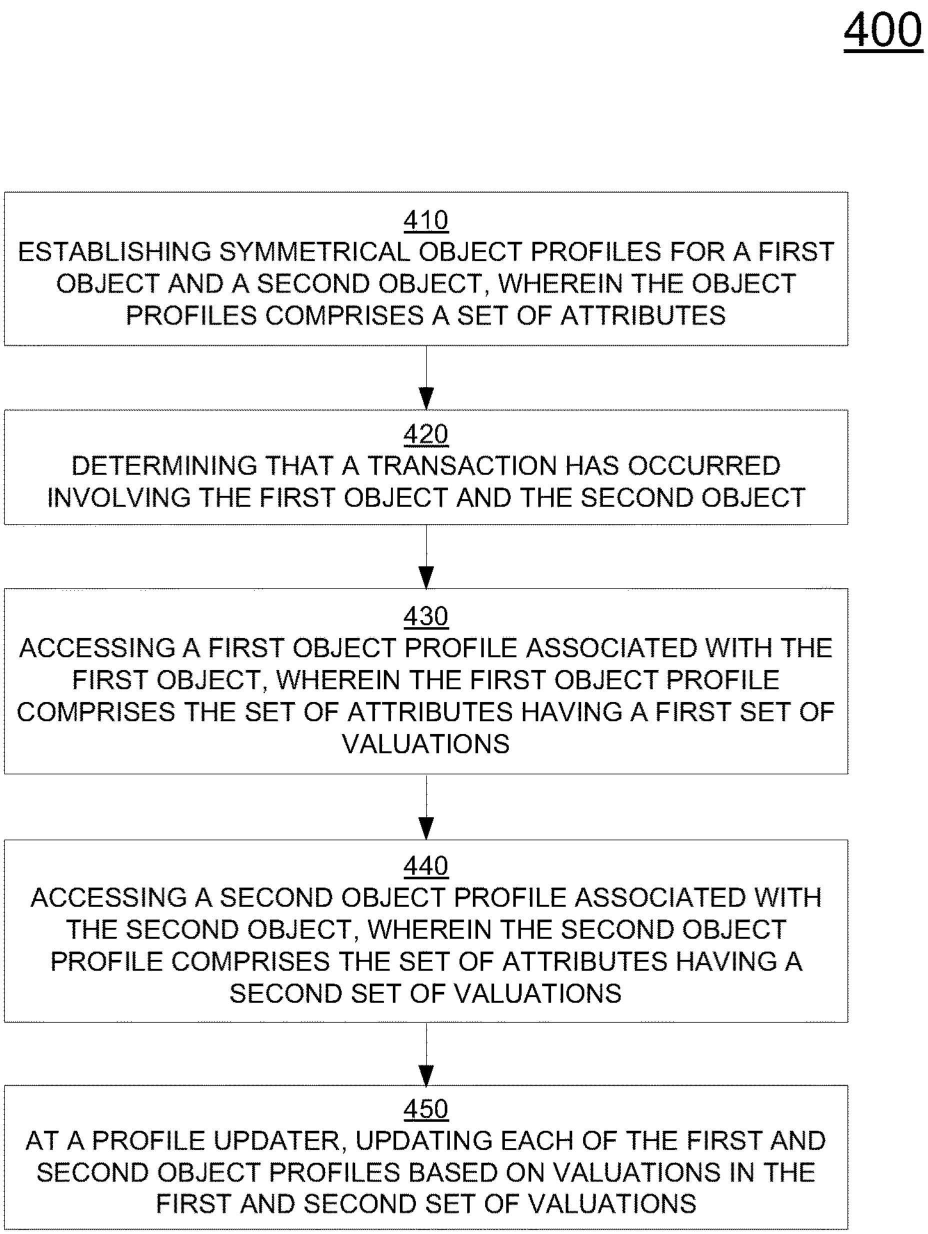
FIG. 4 is a flow diagram illustrating a method for implementing symmetrical object profiles across one or more objects, wherein an object profile is influenced by other object profiles with which it interacts, in accordance with one embodiment of the present disclosure.

FIG. 4 is a flow diagram 400 illustrating a method for implementing symmetrical object profiles across one or more objects, wherein an object profile is influenced by other object profiles with which it interacts, in accordance with one embodiment of the present disclosure. In another embodiment, flow diagram 400 is implemented within a computer system including a processor and memory coupled to the processor and having stored therein instructions that, if executed by the computer system causes the system to execute a method for implementing symmetrical object profiles across one or more objects, wherein an object profile is influenced by other object profiles with which it interacts. In still another embodiment, instructions for performing a method are stored on a non-transitory computer-readable storage medium having computer-executable instructions for causing a computer system to perform a method for implementing symmetrical object profiles across one or more objects, wherein an object profile is influenced by other object profiles with which it interacts. The method outlined in flow diagram 400 is implementable by one or more components of the computer system 100, system 200 and system 300 of FIGS. 12, and 3, respectively.

At 410, the method includes establishing symmetrical object profiles for a first object and a second object. The object profile comprises a set of attributes, and these attributes are used to describe both the first and the second object, even if these two objects are of the same type or of different types (e.g., consumer and product/asset). In that manner, the object profiles are mirrored between the two objects, such that a determination of how close a relationship between the two objects can be made based on comparing attribute valuations in both object profiles. An example of a symmetrical object profile is provided in FIG. 5 as described more fully below.

At 420, the method includes determining that a transaction has occurred involving the first object and the second object. The transaction is defined as any interaction between the first object and the second object. For instance, in the previous example of an online content provider providing access to video content (e.g., television programming, movies), a transaction can involve a consumer object purchasing a movie/asset object. Another transaction includes a general interest of a consumer with a particular asset object (e.g., television programming, movie, etc.) that is expressed through a selective click-through.

At 430, the method includes accessing a first object profile associated with the first object that is involved in the transaction. In the system with symmetrical object profiles, the first object is associated with a first object profile, wherein the first object profile comprises the set of attributes having a first set of valuations. For instance, in a system facilitating transactions between consumer objects and movie/asset objects, the first object comprises a consumer that is associated with a consumer profile as defined by the first set of valuations for the set of attributes.

At 440, the method includes accessing a second object profile associated with the second object that is involved in the transaction. In the system with symmetrical object profiles, the second object is associated with a second object profile, wherein the second object profile comprises the same set of attributes, but now having a second set of valuations. In the example of transactions involving consumer objects and movie/asset objects, the second object comprises a movie asset that is associated with an asset profile as defined by the second set of valuations for the same set of attributes.

At 450, the method includes updating each of the first and second object profiles based on each other's attribute valuations. In one embodiment, updating is performed by a profile updater that creates and manages the first and second object profiles. More particularly, each of the first and second object profiles are updated based on attribute valuations in both object profiles. In that manner, attribute valuations in each of the first and second object profiles are updated to reflect the interaction with the other object. For example, the first object profile is updated based on the second set of valuations of attributes in the second object profile, and as such is influenced by the second object profile. Also, the second object profile is updated based on the first set of valuations of attributes in the first object profile, and as such is influenced by the first object profile.

As such, transaction activity is used to create up-to-date and granular object profiles for the first and second objects that can then be applied for purposes of advertisement, content, and experiences targeting, and furthermore for analytical applications.

FIG. 5 is a Table 500 illustrating a symmetrical object profile, in accordance with one embodiment of the present disclosure. The symmetrical object profile in Table 500 is used in a system that is configured to facilitate interactions and transactions between objects. For example, the system may be configured to facilitate transactions between consumer objects and movie/asset objects for viewing or purchase. The implementation of symmetrical object profiles for objects that potentially can be involved in a transaction provide for a meaningful and quantifiable description of how close a relationship exists between two objects based on comparing attribute valuations in both object profiles.

The symmetrical object profile in Table 500 comprises one or more attributes as defined by attribute column 520, each defining a particular characteristic (e.g., behavioral, demographic, etc.). In one embodiment, attributes are further grouped into one or more categories as defined by the category column 510. As such, attributes within a given category are closely related. Valuations for each category for a particular object profile is provided in the scoring column 530. For purposes of illustration only, categories in the symmetrical object profile 500 include those describing or defining gender, age, and movie genre. Other groupings of the same or different categories and/or attributes may define other symmetrical object profiles 500.

Importantly, attribute valuations can take on a sliding scale within a category. That is, valuations may be greater than 0 for one or more attributes within a given category, as long as attribute valuations within a given category total 100 percent, or a representative 1.000. For example, scores for attributes may be distributed throughout attributes in the age category 515. In that manner, the psychographic profile describing the age of a consumer behaviorally describes a consumer that fits at least partly within one or more age attributes. Further, the total sum of valuations for attributes equals 100 percent for the age category 515. In that manner, an object profile for a given category is no longer shaded, and is shaded between the various attributes.

In particular, in Table 500 the symmetrical object profile includes a gender category 513 that includes two attributes, a male attribute 523A and a female attribute 523B. For example, when used to describe a consumer object, the psychographic profile of the consumer as influenced by the consumer's transactions with other assets, may reflect on the one hand a combination of male and female characteristics, or on the other hand be predominantly male or female. For instance, though a consumer is factually male, the consumer may be psychographically labeled are more female when the consumer repeatedly requests movies exhibiting behavioral characteristic because it is favored by other consumers exhibiting female characteristics/attributes. Also, when used to describe an asset object (e.g., movie), the same attributes are used to give a behavioral characteristic to the asset as reflected and influenced by the users requesting the asset. In that manner, the asset may reflect any combination of male and female characteristics.

Also, the symmetrical object profile of Table 500 includes an age category 515 comprising 7 different attributes 525A-G: a 19-25 attribute 525A, a 26-34 attribute 525B, a 26-34 attribute 525C, a 35-44 attribute 525D, a 45-54 attribute 525E, a 55-65 attribute 525F, and an over 65 attribute 525G. When used to describe a consumer object, the psychographic profile of the consumer may exhibit any combination of age attribute characteristics. For instance, though a consumer may be factually be within the 26-34 attribute 525C, the consumer may be psychographically labeled as more older, as influenced by selection of assets generally favored by older attributed consumers. Similarly, when used to describe an asset object (e.g., movie), one or more combinations of attribute valuations for age attributes is possible, as influenced by those consumers and their age attributes selecting that asset. For instance, a movie may be popular with the 19-25 age attribute 525B, as well as the over 65 attribute 525G.

Further, symmetrical object profile of Table 500 includes a movie genre category 517 that includes 3 attributes, such as, an action attribute 527A, a romance attribute 527B, and a thriller attribute 527C. When used to describe a consumer object, the psychographic profile of the consumer may exhibit any combination of movie genre attributes that define how much that consumer prefers movies of a particular genre, as influenced by characteristics of selected movie assets. Similarly, when used to describe an asset object (e.g., movie), the psychographic profile of the asset may also exhibit any combination of attribute scores or values, as influenced by those consumers who selected that movie asset and their behavioral characteristics.

FIG. 6 is an illustration of the seeding of attribute valuations in two objects within a system configured for implementing symmetrical object profiles across one or more objects, wherein an object profile is influenced by other object profiles with which it interacts, in accordance with one embodiment of the present disclosure. In particular, the object profiles shown in FIG. 6 are consistent with the symmetrical object profile shown in Table 500 of FIG. 5, and comprise a set of attributes, and more specifically, a set of categories (e.g., gender, age and movie genre) for that set of attributes.

Object profiles are implemented in a system that is configured to facilitate interactions and transactions between objects. For example, the system may be configured to facilitate transactions between consumer objects and movie/asset objects for viewing or purchase. For purposes of illustration, the first object 610 comprises a consumer, and the second object 650 comprises a movie asset.

As previously described, the seeding may of initial attribute valuations may be accomplished through various methods, including registration, incorporation and/or interpretation of third party attribute values, or manual settings inputted by a human or automated profiler.

As shown, Table 605 illustrates the seeding of an object profile for a first object 610. Initially, only two attributes in two categories are given valuations. Valuations for attributes in the movie genre category are given a 0.000. More particularly, attribute 630 of the age category is given a value of 100 percent (e.g., 1.000), and defines the consumer, first object 610 as falling within the age of 35-44. Also, attribute 620 of the gender category is given a value of 100 percent (e.g., 1.000), and indicates that the consumer at least initially exhibits full male characteristics. Values for Table 605 may have been provided initially by the consumer through registration.

As shown, Table 655 illustrates the seeding of an object profile for a second object 650. Initially, three attributes across two categories are given valuations. Valuations for attributes in the age category are given a value of 0. More particularly, attribute 660 of the gender category is given a value of 100 percent (e.g., 1.000), and indicates that the movie asset, at least initially, is predicted to be favored by females. Also, attribute 670 and attribute 675 of the movie genre category are each given values of 50 percent (e.g., 0.500). This indicates that the movie asset may exhibit characteristics or fit within both action and thriller genres. Values for Table 655 may have been provided initially by an editor.

The seeding of an object profile begins a history of transactions for the corresponding object. In particular, the seeding defines the first transaction in the history of transactions for the object. Values provided throughout the history of transactions are used to determine the latest attribute valuations, and as such are stored for real-time calculations of attribute valuations as influenced by a transaction conducted with the corresponding object, as will be further described in relation to FIGS. 7A-C.

FIGS. 7A-C illustrate various states of an object profile of a consumer and corresponding object profiles of objects with which the consumer has conducted a transaction after each of three different transactions, in accordance with embodiments of the present disclosure. In particular, the object profiles shown in FIGS. 7A-C are consistent with the symmetrical object profile shown in Table 500 of FIG. 5, and comprise a set of attributes, and more specifically a set of categories (e.g., gender, age, and movie genre) for that set of attributes. For purposes of illustrations, only the gender category as defined by two attributes (e.g., male and female) is shown in each of the object profiles shown in FIGS. 7A-C to illustrate the determination of attribute valuations after each of the transactions.

As previously described, the object profiles are implemented in a system that is configured to facilitate interactions and transactions between objects. For example, the system may be configured to facilitate transactions between consumer objects and movie/asset objects for viewing or purchase. For purposes of illustration, Consumer-A comprises a consumer that is involved in transaction with ASSET-X, ASSET-Y, and ASSET-Z, each of which comprises a movie asset.

In particular, FIG. 7A is an illustration of a first state of an object profile of Consumer-A after an interaction with ASSET-X within a history of interactions involving Consumer-A, in accordance with one embodiment of the present disclosure. For instance, Table 710A illustrates valuations for attributes in the gender category in the object profile of Consumer-A both before and after the transaction involving Consumer-A and ASSET-X. Also, Table 720 illustrates valuations for attributes in the gender category in the object profile of ASSET-X both before and after the transaction involving Consumer-A and ASSET-X.

As shown in Table 710A, attribute valuations are reflective of two transactions in a history of transactions involving Consumer-A to include the current transaction with ASSET-X. Previously, the first transaction in the history of transactions was the initial seeding of attribute valuations, as described in Table 605 of FIG. 6. As such, under the old score, the psychographic profile of Consumer-A indicates a fully male characteristic as indicated by the 100 percent value (0.000) in the male attribute, and the 0 percent value (e.g., 0.000) for the female attribute.

Also, as shown in Table 720, attribute valuations are reflective of two transactions in a history of transactions involving ASSET-X, to include the current transaction with Consumer-A. Previously, the first transaction in the history of transactions for ASSET-X may have been with Consumer-A or another consumer, or may have been seeded with attribute valuations by an editor. As such, under old score, the psychographic profile of ASSET-X indicates a fully female characteristic, as indicated by the 100 percent value (e.g., 1.000) in the female attribute, and the 0 percent value (0.000) for the male attribute in Table 720.

Looking at the object profile for Consumer-A in Table 710A, the new scores for the male and female attributes are influenced by the attribute valuations in the object profile for ASSET-X after the transaction between Consumer-A and ASSET-X. In that manner, the attribute valuations for Consumer-A are updated to reflect the interaction with the ASSET-X, and in a way takes on the behavioral characteristics of the ASSET-X.

In particular, attribute valuations for any attribute is updated by averaging corresponding attribute values for objects in a history of transactions involving Consumer-A, wherein the average is based on the total number of transactions. In the present example as shown in Table 710A, for the male attribute 715A, the history of transactions includes an attribute valuation from the initial seeding (1.000) as indicated from the old score in Table 710A, and the contributions of the attribute valuation (0.000) from the object profile of ASSET-X as indicated by the current transaction with ASSET-X and Consumer-A. As such, the average of the attribute values for the male attribute in the history of transactions involving Consumer-A and its corresponding objects is 1/2(1.000+0.000)=0.500 or 50 percent, as indicated under the new score for the male attribute 715A for Consumer-A. Similarly, the average of the attribute values for the female attribute in the history of transactions involving Consumer-A and its corresponding objects is 1/2(0.000+1.000)=0.500 or 50 percent, as indicated under the new score for the female attribute 717A for Consumer-A.

As shown in Table 710A, after the transaction with ASSET-X, Consumer-A behaviorally is a mixture of 50 percent male and 50 percent female. This is in contrast to the 100 percent male characteristic for Consumer-A exhibited before the transaction with ASSET-X. This is due in part to the low sample size, and the highly opposite scoring for gender attributes between Consumer-A and ASSET-X. However, within a few transactions, a more accurate reflection of the behavioral characteristics for Consumer-A will be shown in the object profile, as is shown in FIGS. 7B-C.

For the object profile for ASSET-X shown in Table 720, for the male attribute 725, the history of transactions includes an attribute valuation from the initial seeding (0.000) as indicated from the old score in Table 720, and the contributions of the attribute valuation (1.000) from the object profile of Consumer-A, as indicated by the current transaction with ASSET-X and Consumer-A. As such, the average of the attribute values for the male attribute in the history of transactions involving ASSET-X and its corresponding objects is 1/2(0.000+1.000)=0.500 or 50 percent, as indicated under the new score for the male attribute 725 for ASSET-X. Similarly, the average of the attribute values for the female attribute in the history of transactions involving ASSET-X and its corresponding objects is 1/2(1.000+0.000)=0.500 or 50 percent, as indicated under the new score for the female attribute 727 for ASSET-X.

In particular, FIG. 7B is an illustration of a second state of an object profile of Consumer-A after an interaction with ASSET-Y within a history of interactions involving Consumer-A, in accordance with one embodiment of the present disclosure. For instance, Table 710B illustrates valuations for attributes in the gender category in the object profile of Consumer-A both before and after the transaction involving Consumer-A and ASSET-Y. Also, Table 730 illustrates valuations for attributes in the gender category in the object profile of ASSET-Y both before and after the transaction involving Consumer-A and ASSET-Y.

As shown in Table 710B, attribute valuations under the new score are reflective of three transactions in a history of transactions involving Consumer-A to include the current transaction with ASSET-Y, the transaction with ASSET-X, and the initial seeding of attribute valuations, as described in Table 605 of FIG. 6. Under the old score in Table 710B, the psychographic profile of Consumer-A indicates a 50 percent (0.500) male and female valuation representative of the first state of the object profile for Consumer-A.

Also, as shown in Table 730, attribute valuations are reflective of thirty-one transactions in a history of transactions involving ASSET-Y, to include the current transaction with Consumer-A. Under the old score, the psychographic profile of ASSET-Y indicates a sixty-three percent (0.633) male characteristic and a thirty-seven (0.367) female characteristic in Table 730.

Looking at the object profile for Consumer-A in Table 710B, the new scores for the male and female attributes are influenced by the attribute valuations in the object profile for ASSET-Y after the transaction between Consumer-A and ASSET-Y. In that manner, the attribute valuations for Consumer-A are updated to reflect the interaction with the ASSET-Y, and in a way takes on the behavioral characteristics of the ASSET-Y. As previously described, attribute valuations for any attribute is updated by averaging corresponding attribute values for objects in a history of transactions.

In the present example as shown in Table 710B, for the male attribute 715B, the history of transactions includes an attribute valuation from the initial seeding (1.000), and the contributions of the attribute valuation (0.000) from the object profile of ASSET-X, and the contributions of the attribute valuation (0.633) from the object profile of ASSET-Y. As such, the average of the attribute values for the male attribute in the history of transactions involving three transactions between Consumer-A and its corresponding objects is 1/3(1.000+0.000+0.633)=0.544 or 54 percent, as indicated under the new score for the male attribute 715B for Consumer-A. Similarly, the average of the attribute values for the female attribute in the history of transactions involving Consumer-A and its corresponding objects is 1/3(0.000+1.000+0.367)=0.456 or 46 percent, as indicated under the new score for the female attribute 717B for Consumer-A.

For the object profile for ASSET-Y shown in Table 730, for the male attribute 735, the history of transactions includes valuations from 30 transactions (not shown) and the contributions of the attribute valuation (0.500) from the object profile of Consumer-A, as indicated by the current transaction between ASSET-Y and Consumer-A. As such, the average of the attribute values for the male attribute in the history of transactions involving ASSET-Y and its corresponding objects is approximately 63 percent, as indicated under the new score for the male attribute 735 for ASSET-Y. Similarly, the average of the attribute values for the female attribute in the history of transactions involving ASSET-Y and its corresponding objects is approximately 37 percent, as indicated under the new score for the female attribute 737 for ASSET-Y.

Moreover, FIG. 7C is an illustration of a third state of an object profile of Consumer-A after an interaction with ASSET-Z within a history of interactions involving Consumer-A, in accordance with one embodiment of the present disclosure. For instance, Table 710C illustrates valuations for attributes in the gender category in the object profile of Consumer-A both before and after the transaction involving Consumer-A and ASSET-Z. Also, Table 740 illustrates valuations for attributes in the gender category in the object profile of ASSET-Z both before and after the transaction involving Consumer-A and ASSET-Z.

As shown in Table 710C, attribute valuations under the new score are reflective of four transactions in a history of transactions involving Consumer-A to include the current transaction with ASSET-Z, the transaction with ASSET-Y, the transaction with ASSET-X, and the initial seeding of attribute valuations. Under the old score in Table 710C, the psychographic profile of Consumer-A indicates a 54 percent (0.544) male valuation and 46 percent (0.456) representative of the second state of the object profile for Consumer-A.

Also, as shown in Table 740, attribute valuations are reflective of twelve transactions in a history of transactions involving ASSET-Z, to include the current transaction with Consumer-A. Under the old score, the psychographic profile of ASSET-Z indicates a 75 percent (0.750) male characteristic and a twenty-five (0.250) female characteristic in Table 740.

Looking at the object profile for Consumer-A in Table 710C, the new scores for the male and female attributes are influenced by the attribute valuations in the object profile for ASSET-Z after the transaction between Consumer-A and ASSET-Z. In that manner, the attribute valuations for Consumer-A are updated to reflect the interaction with the ASSET-Z, and in a way takes on the behavioral characteristics of the ASSET-Z. As previously described, attribute valuations for any attribute is updated by averaging corresponding attribute values for objects in a history of transactions.

In the present example as shown in Table 710C, for the male attribute 715C, the history of transactions includes an attribute valuation from the initial seeding (1.000), and the contribution of the attribute valuation (0.000) from the object profile of ASSET-X, the contribution of the attribute valuation (0.633) from the object profile of ASSET-Y, and the contribution of the attribute valuation (0.750) from the object profile of ASSET-Z. As such, the average of the attribute values for the male attribute in the history of transactions involving four transactions between Consumer-A and its corresponding objects is 1/4(1.000+0.000+0.633+0.750)=0.596 or 60 percent, as indicated under the new score for the male attribute 715C for Consumer-A. Similarly, the average of the attribute values for the female attribute in the history of transactions involving Consumer-A and its corresponding objects is 1/4(0.000+1.000+0.367+0.250)=0.404 or 40 percent, as indicated under the new score for the female attribute 717C for Consumer-A.

For the object profile for ASSET-Z shown in Table 740, for the male attribute 735, the history of transactions includes valuations from 12 transactions (not shown) and the contributions of the attribute valuation (0.544) from the object profile of Consumer-A, as indicated by the current transaction between ASSET-Z and Consumer-A. As such, the average of the attribute values for the male attribute in the history of transactions involving ASSET-Z and its corresponding objects is approximately 73 percent, as indicated under the new score for the male attribute 745 for ASSET-Z. Similarly, the average of the attribute values for the female attribute in the history of transactions involving ASSET-Z and its corresponding objects is approximately 27 percent, as indicated under the new score for the female attribute 747 for ASSET-Z.

Thus, according to embodiments of the present disclosure, systems and methods are described for implementing symmetrical object profiles across one or more objects, wherein an object profile is influenced by other object profiles with which it interacts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A system for generating updated symmetrical object profiles over a communications network, said system comprising:

a memory resident on a host computer system and configured to store a plurality of object profiles for a plurality of objects, wherein a first object profile from said plurality of object profiles comprises a consumer profile associated with a first object and comprising a first set of attributes having a first set of valuations, wherein said memory is configured to store a second object profile from said plurality of object profiles, wherein said second object profile comprises an asset profile associated with a second object and comprising a second set of attributes having a second set of valuations; and a processor on said host computer system coupled to said memory and configured to detect a first online interaction between said first object and said second object over a communications network, wherein said processor is configured to calculate updated attribute valuations for said consumer profile and said asset profile based on said first online interaction, wherein said processor is configured to determine symmetry between said first object and a third object by comparing the updated attribute valuations for said first object profile with attribute valuations associated with a third object profile for said third object, wherein said symmetry indicates a high likelihood that said first object will interact with said third object during a second online transaction.

2. The system of claim 1, wherein said first object profile is updated based on said second set of valuations for said second object profile, and said second object profile is updated based on said first set of valuations for said first object profile.

3. The system of claim 2, wherein an attribute of said first object profile is updated by averaging attribute values of said attribute for objects in a history of transactions involving said first object over a total number of transactions.

4. The system of claim 3, wherein said history of transactions includes an initial seeding of said first object profile.

5. The system of claim 1, wherein said first and second sets of attributes comprises:

a category comprising one or more category attributes, wherein valuations for said one or more category attributes total 100 percent.

6. The system of claim 1, wherein said first object comprises a group of objects each of which is associated with a corresponding object profile, and said first object profile is based on objects profiles of said group of objects.

7. The system of claim 1, wherein said processor is configured to calculate attribute valuations for said consumer profile and said asset profile based on a history of online interactions.

8. A computer-implemented method for generating updated symmetrical object profiles over a communications network, said method comprising:

storing, in memory resident on a host computer system, a plurality of object profiles for a plurality of objects, wherein a first object profile from said plurality of object profiles is a consumer profile and is associated with a first object and comprises a first set of attributes and a second object profile from said plurality of object profiles is an asset profile and is associated with a second object and comprises a second set of attributes;

detecting a first online interaction between said first object and said second object over a communications network;

calculating updated attribute valuations for said consumer profile and said asset profile based on said first online interaction; and determining symmetry between said first object and a third object by comparing the updated attribute valuations for said first object profile with attribute valuations associated with a third object profile for said third object, wherein said symmetry indicates a high likelihood that said first object will interact with said third object during a second online transaction.

9. The method of claim 8, further comprising:

updating a first attribute of said first object profile by averaging valuations for said first attribute associated with a history of transactions involving said first object that is based on a total number of transactions in said history of transactions.

10. The method of claim 9, further comprising:

seeding said first attribute with an initial valuation as a first transaction in said history of transactions.

11. The method of claim 8, further comprising:

configuring a group of one or more category attributes in said first and second sets, wherein valuations for said group of one or more category attributes total 100 percent for a category in any given object profile.

12. The method of claim 11, wherein valuations for said group of one or more category attributes across said category are unique between a first object and a second object.

13. The method of claim 8, further comprising:

configuring said first object as a group of one or more objects, wherein each object in said group is associated with a corresponding object profile; and configuring said first object profile based on object profiles in said group of one or more objects.

14. The method of claim 13, wherein said configuring said first object profile further comprises:

for an attribute in said first object profile, averaging valuations of corresponding first attributes of object profiles in said group of one or more objects that is based on the number of object profiles.

15. The method of claim 8, wherein said calculating further comprises calculating valuations for said consumer profile and said asset profile based on a history of online interactions.

16. A non-transitory computer-readable medium having computer executable instructions for performing a computer-implemented method for updating symmetrical object profiles over a communications network, said method comprising:

storing, in memory resident on a host computer system, a plurality of object profiles for a plurality of objects, wherein a first object profile from said plurality of object profiles is a consumer profile and is associated with a first object and comprises a first set of attributes and a second object profile from said plurality of object profiles is an asset profile and is associated with a second object and comprises a second set of attributes;

detecting a first online interaction between said first object and said second object over a communications network;

calculating updated attribute valuations for said consumer profile and said asset profile based on said first online interaction;

determining symmetry between said first object and a third object by comparing the updated attribute valuations for said first object profile with attribute valuations associated with a third object profile for said third object, wherein said symmetry indicates a high likelihood that said first object will interact with said third object during a second online transaction.

17. The computer-readable medium of claim 16, wherein said updating each of said first and second object profiles in said method comprises:

updating a first attribute of said first object profile by averaging valuations for said first attribute associated with a history of transactions involving said first object that is based on a total number of transactions in said history of transactions.

18. The computer-readable medium of claim 17, wherein said method further comprises:

seeding said first attribute with an initial valuation as a first transaction in said history of transactions.

19. The computer-readable medium of claim 16, wherein said method further comprises:

configuring a group of one or more category attributes in said first and second sets, wherein valuations for said group of one or more category attributes total 100 percent for a category in any given object profile.

20. The computer-readable medium of claim 16, wherein said plurality of object profiles comprises vectors for said plurality of objects.

* * * * *